United States Patent
Corley

(10) Patent No.: US 8,797,411 B2
(45) Date of Patent: Aug. 5, 2014

(54) APPARATUS AND METHOD USED TO EVALUATE AND OPTIMIZE IMAGE QUALITY IN HIGH COLOR GAMUT IMAGING SYSTEMS

(76) Inventor: Ferrand David E Corley, Mississauga (CA)

( * ) Notice: Subject to any disclaimer, the term of this patent is extended or adjusted under 35 U.S.C. 154(b) by 199 days.

(21) Appl. No.: 13/373,621

(22) Filed: Nov. 22, 2011

(65) Prior Publication Data

US 2012/0120253 A1    May 17, 2012

Related U.S. Application Data

(63) Continuation-in-part of application No. 12/923,332, filed on Sep. 15, 2010, now abandoned.

(60) Provisional application No. 61/272,366, filed on Sep. 17, 2009.

(51) Int. Cl.
| | |
|---|---|
| *H04N 17/00* | (2006.01) |
| *H04N 17/02* | (2006.01) |
| *G01J 3/46* | (2006.01) |
| *G01J 3/52* | (2006.01) |
| *H04N 17/04* | (2006.01) |
| *G01J 3/02* | (2006.01) |

(52) U.S. Cl.
CPC .... *G01J 3/46* (2013.01); *G01J 3/52* (2013.01); *H04N 17/04* (2013.01); *G01J 3/0262* (2013.01); *H04N 17/02* (2013.01); *G01J 3/462* (2013.01)
USPC .......................................... 348/187; 348/175

(58) Field of Classification Search
USPC .................. 348/175–182, 184, 187–188, 189
See application file for complete search history.

(56) References Cited

U.S. PATENT DOCUMENTS

| | | | | |
|---|---|---|---|---|
| 5,739,809 A * | 4/1998 | McLaughlin et al. | ........ | 345/594 |
| 5,760,403 A * | 6/1998 | Elabd | ........................ | 250/370.11 |
| 6,631,206 B1 * | 10/2003 | Cheng et al. | ................... | 382/164 |
| 6,700,627 B2 * | 3/2004 | Yang et al. | ..................... | 348/674 |
| 7,136,076 B2 * | 11/2006 | Evanicky et al. | ............. | 345/600 |
| 7,522,203 B2 * | 4/2009 | Fabinski et al. | .............. | 348/294 |
| 7,592,996 B2 * | 9/2009 | Brown et al. | ................. | 345/102 |
| 7,683,881 B2 * | 3/2010 | Sun et al. | ...................... | 345/156 |
| 7,869,705 B2 * | 1/2011 | Liu et al. | ....................... | 396/164 |
| 8,189,243 B1 * | 5/2012 | Borg | ............................. | 358/518 |
| 8,212,930 B2 * | 7/2012 | Park | ............................. | 348/602 |
| 2005/0243339 A1 * | 11/2005 | Kuhn et al. | .................... | 358/1.9 |
| 2006/0164700 A1 * | 7/2006 | Hayashi | ........................ | 358/518 |
| 2010/0253946 A1 * | 10/2010 | Corley | .......................... | 356/421 |
| 2011/0063454 A1 * | 3/2011 | Corley | .......................... | 348/180 |
| 2012/0056911 A1 * | 3/2012 | Safaee-Rad et al. | .......... | 345/690 |
| 2013/0010010 A1 * | 1/2013 | Holub | ........................... | 345/690 |

* cited by examiner

*Primary Examiner* — Brian Yenke

(57) ABSTRACT

A test apparatus comprising a combination of front illuminated and rear illuminated optical reference test elements designed to produce predetermined electronic signals. The front illuminated elements comprise spectrophotometrically neutral gray patches and primary and secondary color patches of predetermined hues. Additional color patches having the same hue as the primaries and secondaries, but at lower saturation levels, generate unique logical patterns on display devices well known to the broadcasting and image reproducing industries. The rear illuminated test elements comprise wide color gamut hues at levels of saturation not attainable in reflected light systems. Also disclosed is a method of evaluating and optimizing the image quality in high gamut imaging systems, using the above described apparatus.

11 Claims, 8 Drawing Sheets

Fig. 5
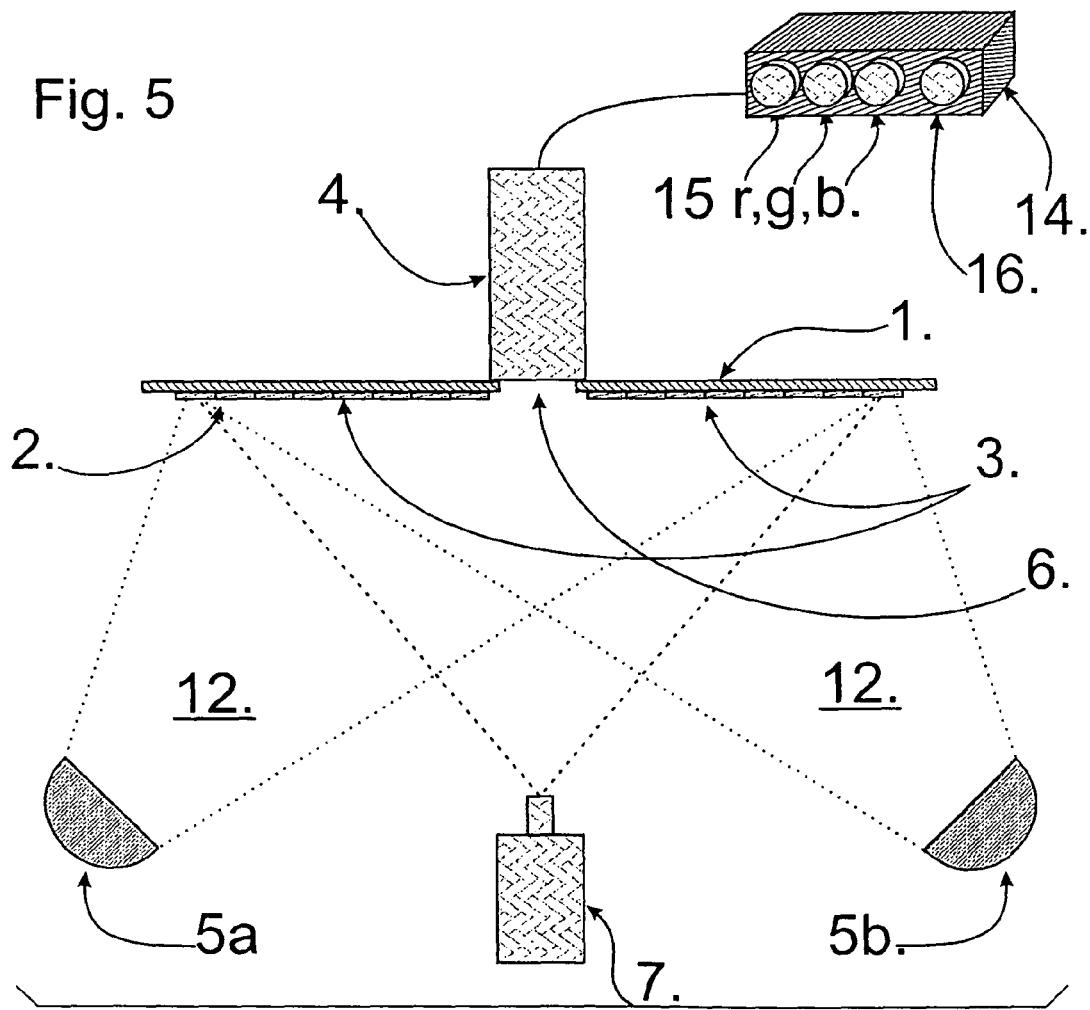
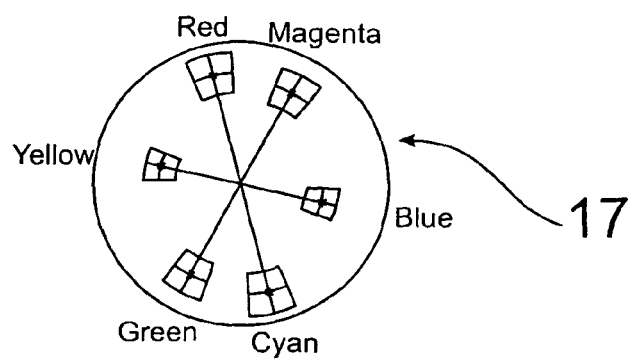
Fig. 6

APPARATUS AND METHOD USED TO EVALUATE AND OPTIMIZE IMAGE QUALITY IN HIGH COLOR GAMUT IMAGING SYSTEMS

This application is a Continuation in Part application based on U.S. Complete application Ser. No. 12/923,332 Filed Sep. 15 2010, title APPARATUS AND METHOD USED TO EVALUATE AND OPTIMIZE IMAGE QUALITY IN HIGH COLOUR GAMUT IMAGING SYSTEMS. Inventor: Ferrand D E Corley which was based on U.S. provisional application 61/272,366, filed Sep. 17 2009, Title; Apparatus and method used to evaluate and optimize image quality in high color gamut imaging systems Inventor: Corley; Ferrand D. E. (Kleinberg, Ontario, Calif.)

FIELD OF THE INVENTION

The invention relates to a an apparatus and system and method for evaluating images and for optimizing image quality in High Gamut Colour Imaging Systems such as Colour Cameras.

BACKGROUND OF THE INVENTION

Over the past 30 years the dynamic range of imaging systems has increased substantially; particularly in television and digital motion picture production. This is true both for image production, where cameras and memory devices record and store image data, and for playback systems such as television receivers, computer monitors and digital cinema projectors, which reproduce and display the image data for viewing. Early television cameras had a narrow, white to black, dynamic range of about 20:1; similarly color saturation was limited. Today, electronic cameras have a dynamic range of 3000:1 or higher and the color gamut of some cameras even exceeds that of human vision. This has resulted in challenges in the testing and alignment of such cameras, and the subsequent alignment and adjustment of image reproduction systems to provide faithful reproduction of images recorded by said cameras.

Traditional front lit test charts have the benefit of being easy to use, but inherently have a low dynamic range and low color saturation. Rear-lit test systems can have a higher dynamic range and greater color saturation, but are cumbersome and awkward to use.

BRIEF SUMMARY OF THE INVENTION

This invention is designed to overcome these limitations by providing an apparatus designed for use in evaluating and adjusting the color and tonal reproduction of electronic imaging systems capable of recording and reproducing images of high dynamic range and extended color saturation. Said imaging systems include cameras, scanners, monitors, projectors and other devices used in the recording and reproduction of moving and still images.

The invention provides such an apparatus wherein a front illuminated precision grayscale with black and white reference patches and mid-saturation color patches also incorporates a rear illuminated light source capable of emitting colors of exceedingly high saturation close to or beyond that capable of being perceived by human vision.

The invention further provides such an apparatus where the three primary colors, red, green, and blue are combined in a single beam.

The invention further provides such an apparatus where the three primary colors may be turned on and off in sequence to produce six different highly saturated colors red, green, blue, cyan, magenta and yellow.

The invention further provides such an apparatus where the sequencing speed and order may be varied.

The invention further provides such an apparatus where the sequencing speed may be increased to the point where, due to the persistence of human vision, instead of seeing individual colors, the single rear illuminated area appears as white.

The invention further provides such an apparatus where by adjusting the brightness of each of the red, green and blue light channels individually, the color of the white light being emitted from the rear illuminated light source can be adjusted infinitely from 2500° Kelvin to 12,000° Kelvin The invention further provides such an apparatus where the Kelvin temperature of light being emitted by the rear illuminated light source may be switchable and set to a number of standard color temperatures such as 3000, 3200, 5000, 5500, 6000 and 6500 K.

The invention further provides such an apparatus where separate cyan, magenta and yellow channels are added to the red, green and blue and, instead of being combined, emit their colors individually so that they may be seen simultaneously by a camera or other device viewing or recording the image produced by the apparatus.

The invention further provides such an apparatus where individual controls are provided for setting the brightness level of each color.

The invention further provides such an apparatus where light absorbing baffles help maintain maximum saturation in the rear illuminated colors by restricting light being used to illuminate the front-lit grayscale and color components from reaching the highly saturated elements.

The invention further provides such an apparatus wherein a space is provided between the light absorbing baffles and the diffuser, and including a black panel insertable into said space The invention also provides a method of evaluating and adjusting the image quality of high gamut colour images and providing for viewing by such an imaging system a front illuminated precision grayscale with black and white reference patches and mid-saturation color patches and a rear illuminated light source capable of emitting colors of exceedingly high saturation close to or beyond that capable of being perceived by human vision.

BRIEF DESCRIPTION OF THE DRAWINGS

The invention is described by way of illustration with reference to the accompanying drawings in which:

FIG. 5-*is* a plan view of a second embodiment of the apparatus in a typical operational environment ;

FIG. 6-*is* a front elevation of the vector scope display;

DESCRIPTION OF A PREFERRED EMBODIMENT

Figure 1:
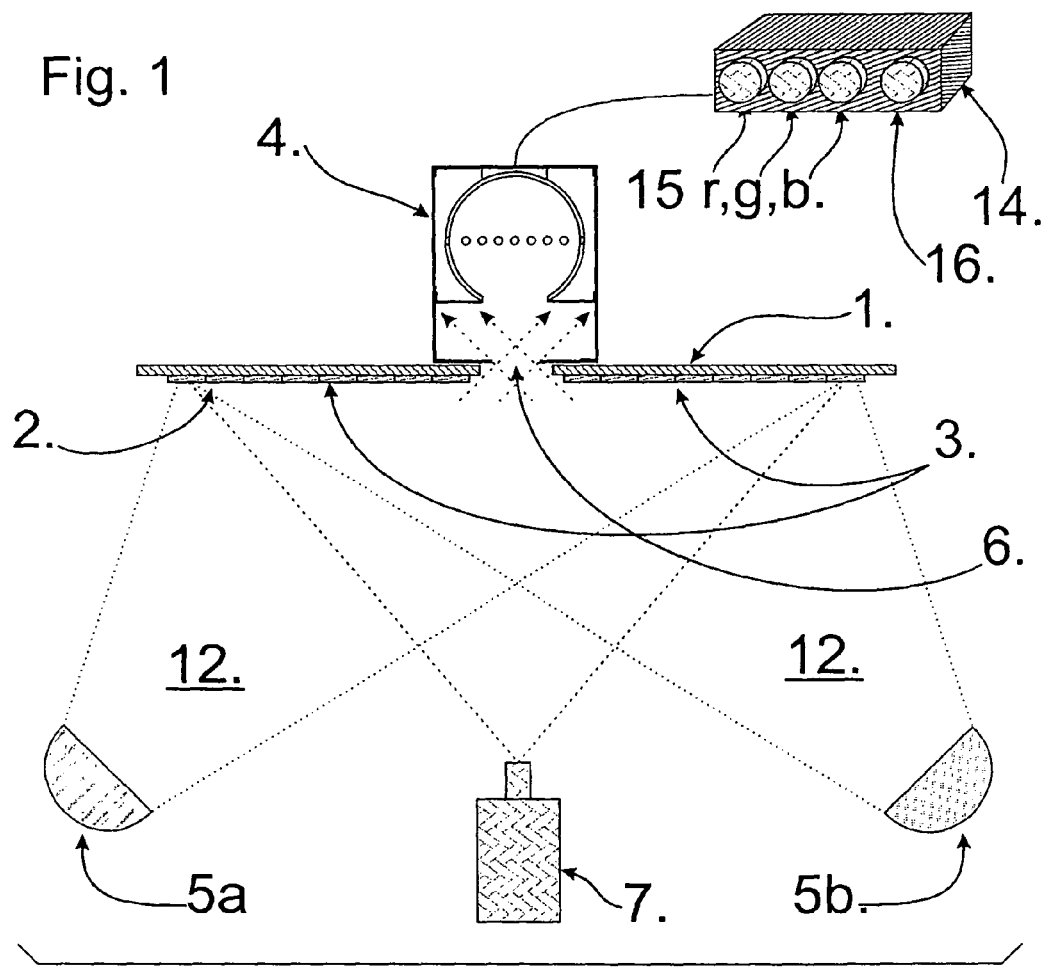
FIG. 1-*is* a plan view of one embodiment of the apparatus in a typical operational environment.

Referring to FIGS. 1-10, Grayscale (2) and color reference elements (3) are attached to a supporting member (1) and illuminated by light sources (5a) and (5b).

Front light sources (5a & 5b) emit beams of illumination (12) directed at the elements (2) and (3). Supporting panel member (1) is equipped with an aperture (6) located centrally in the panel. Behind the panel a rear illuminated light source assembly (4) is attached to said supporting panel member (1). Light source assembly (4) has illuminants (13) (FIG. 2,3,8, and 9) which generate colors having specific characteristics significantly more saturated than can be reproduced by light reflected from the color reference elements (3). The primary colors produced by light source assembly (4) are typically Red, Green, and Blue, secondary colours Cyan, Magenta and Yellow are produced by combining the primaries, Green, plus blue making Cyan etc., and lower saturated colours including White are produced by varying the combination of Red, Green and Blue and their relative brightness levels.

An image recording device such as a camera (7) or scanner, records an image of precision grayscale (2) and color reference elements (3) along with the colors generated by light source assembly (4) and displays electronic signals generated by the camera (7) on a vector scope (17) or other instrumentation known in the trade for reproducing grayscale and color data from digital images. This enables more detailed analysis of the color data than can be obtained from a visual representation of the image on a monitor or other imaging device.

Figure 8:
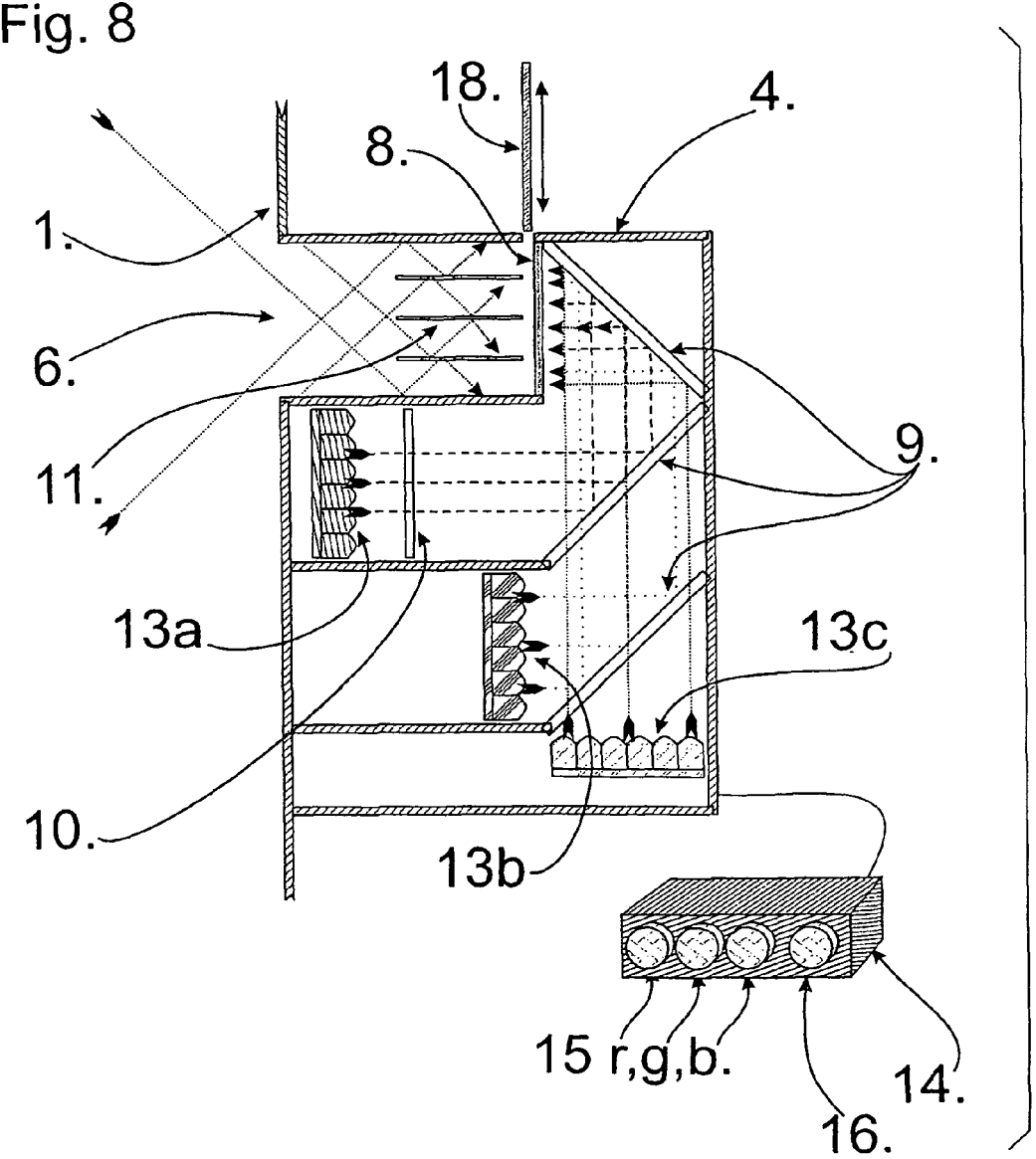
FIG. 8-*is* an enlarged side view in section of the second embodiment of the rear illuminated light source assembly.

One or more diffusers (8) may be inserted in the light path within the light source assembly (4) to even the illumination from the rear illuminants (13 a, b, and c) (FIG. 8, 9). Similarly, dichroic mirrors (9) (FIG. 8), and/or narrow band pass filters (10) may be inserted in the light source assembly (4) to narrow the spectral distribution of each light source.

Light absorbing panels (11) (FIG. 2, 8,9) are provided forming an enclosed connecting passageway between the supporting panel member (1) and the rear light source assembly (4). Panels (11) trap light from front illumination (12) from light sources (5a and 5b) (FIG. 1), which would otherwise result in the illumination (12) from being reflected by diffuser panel (8) and which would reduce the saturation of colors from light source/s (13 a, b and c).

Color controls (15 r,g,b) in control unit (14) enable precise adjustment of the mix and intensity of the light sources (13) to obtain the highly saturated colors generated and emitted by light source assembly (4).

Switching speed control (16) adjusts the duration that light sources (13) remain illuminated. The typical switching sequence is 1) (13a)=Red, 2) (13a+c) (Red+Blue)=Magenta, 3) (13c)=Blue, 4) (13 c+b) (Blue+Green)=Cyan, 5) (13b) =Green and 6) (13a+b) (Green+Red)=Yellow, then the sequence starts over again.

With the speed control set to Low, each color, or color pair, stays on for one second; by increasing the cycling speed the rapidly changing colors will, through perception of human vision, appear to be white.

Color controls (15) can then be finely adjusted so that the "white" being produced by light sources (13) matches the white patches on the grayscale being illuminated by external light sources (5a and 5b). Depending on the application this will typically be 3200K, D50, or D65

However, the individual colors generated by light sources (13) will still reproduce as individual color signals on the vectorscope (17) (FIG. 6).

Figure 2:
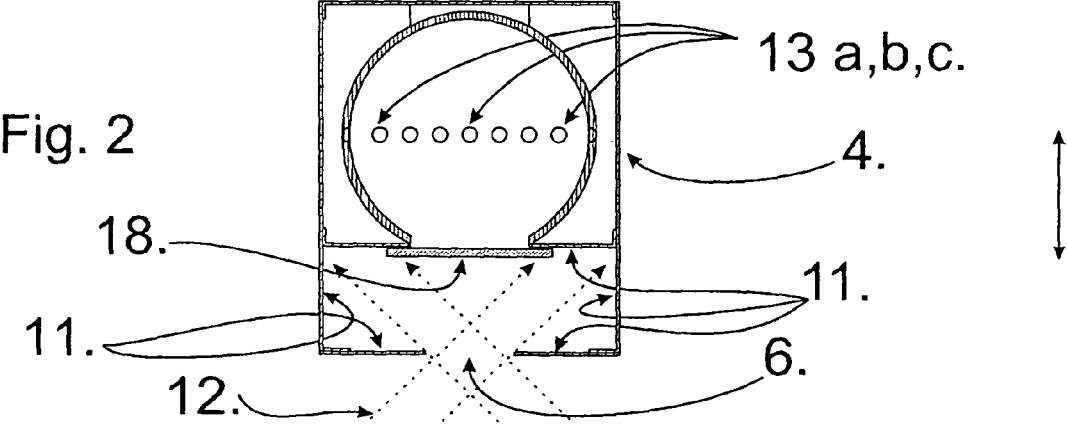
FIG. 2-*is* an enlarged plan of a portion of FIG. 1.
Figure 3:
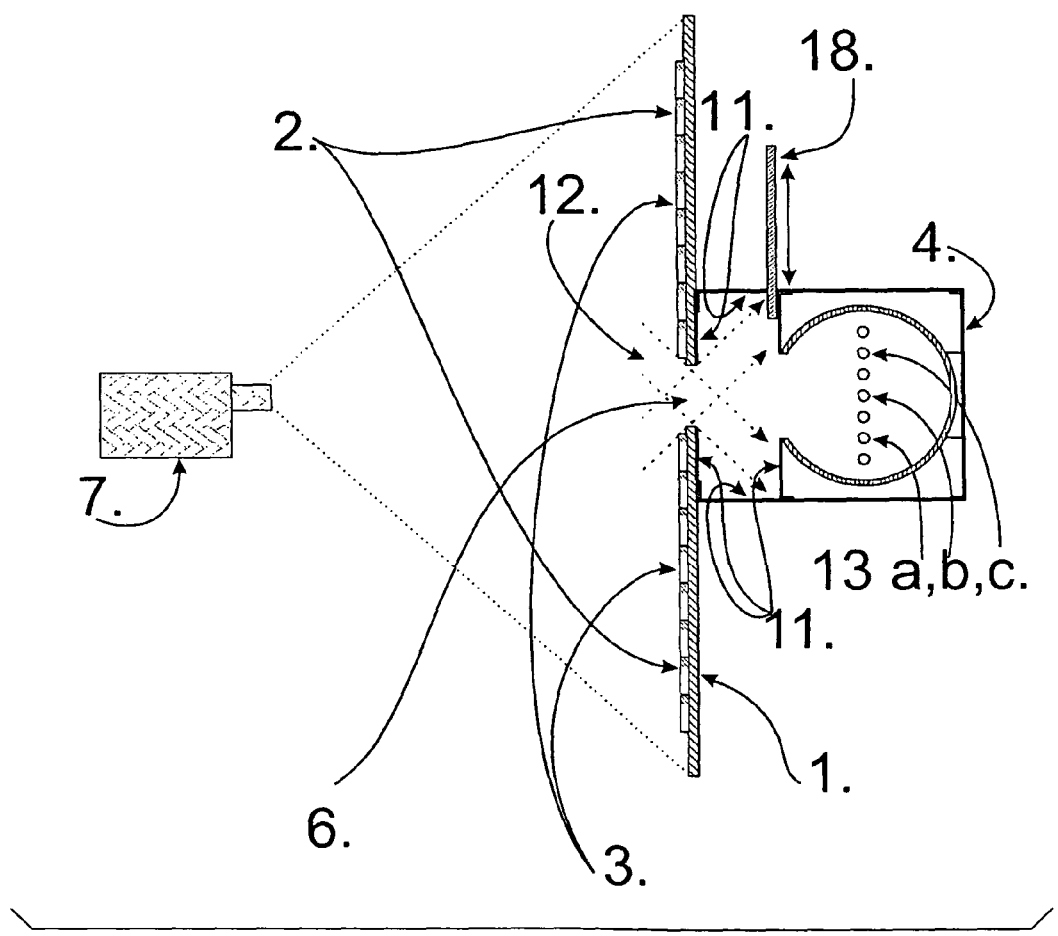
FIG. 3-*is* a side view in section of the embodiment of FIG. 1.
Figure 4:
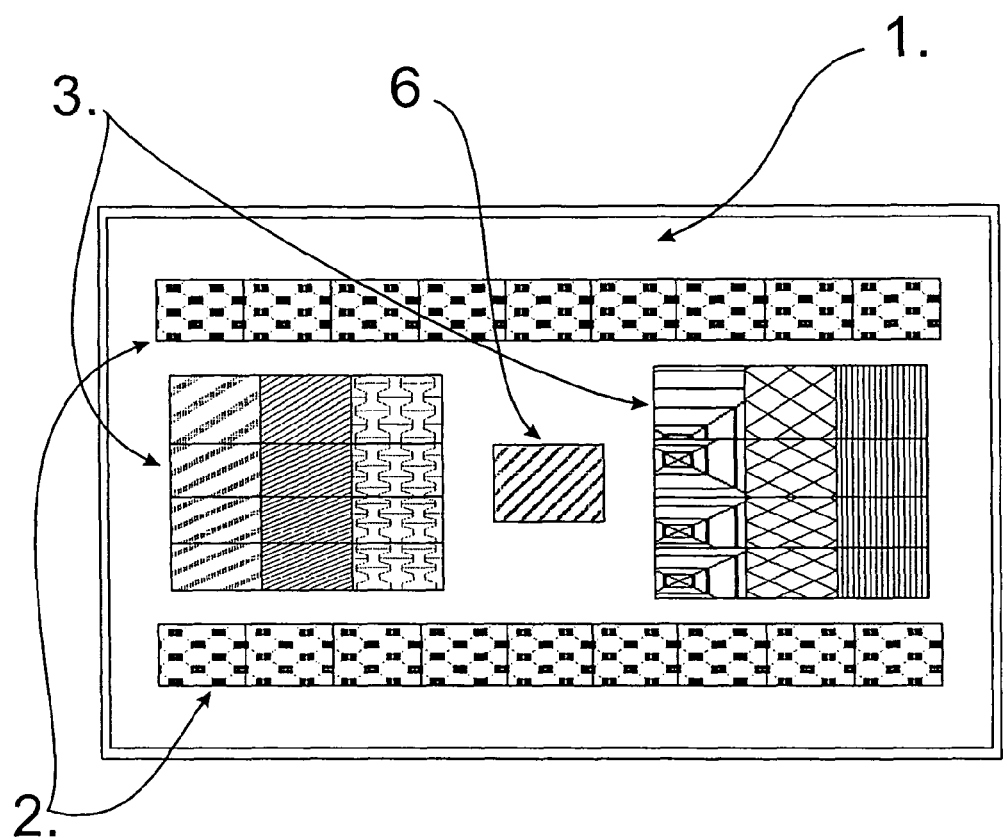
FIG. 4-I*s* a front elevation of the supporting member 1 and elements thereon of FIG. 1 or 3.
Figure 7:
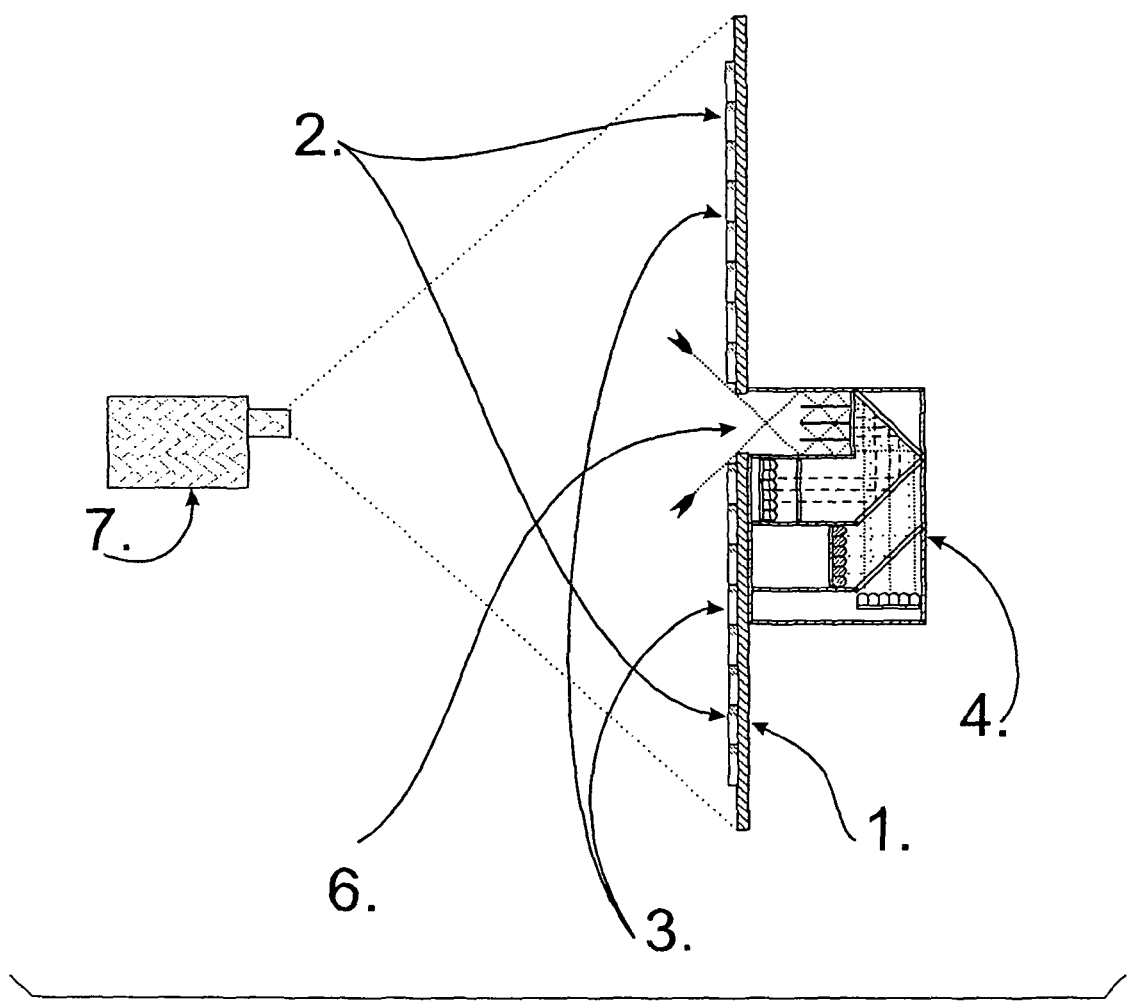
FIG. 7-*is* a side view corresponding to the second embodiment of the apparatus and rear illuminated light source assembly in FIG. 5.

To produce the blackest level possible, provision may be made in light source assembly (4) to enable the insertion of a black panel (18) in front of illuminants (13), (FIGS. 2,3 8).

Figure 9:
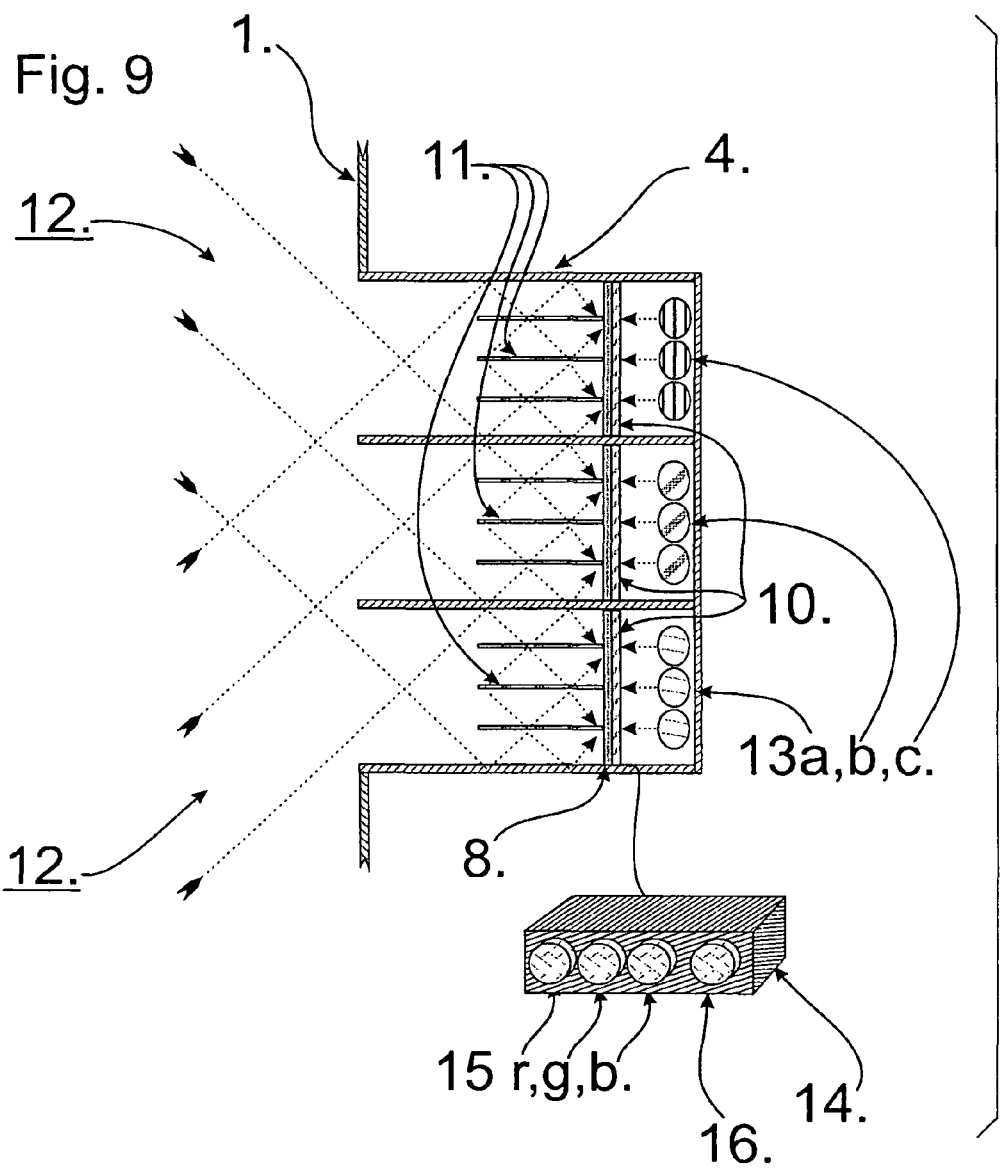
FIG. 9-*is* a plan view of a further alternate embodiment of the rear illuminated light source in FIG. 7 and, FIG. 10-is a front elevation of the further alternate embodiment of supporting member 1 in FIG. 9.
Figure 10:
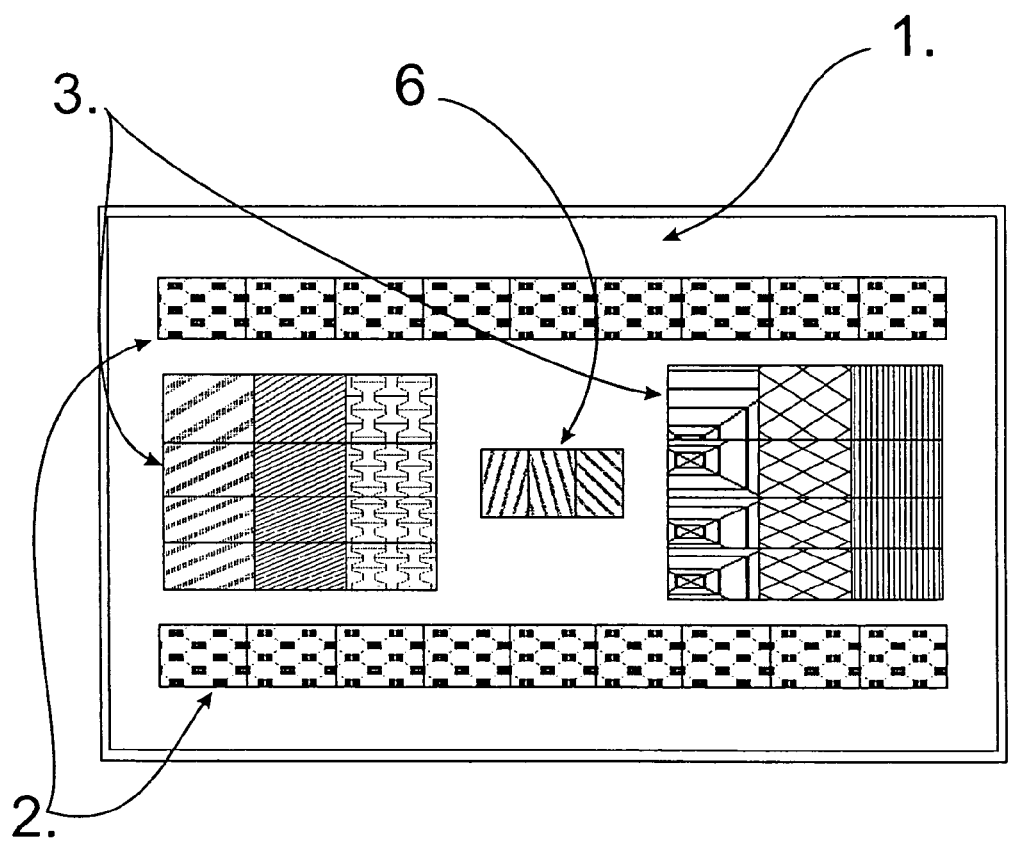

Further embodiments may include;

a—In the embodiment of FIG. 9 , three or more individual rear illuminants (13) a,b,c in light source assembly (4) shine individually through separate apertures in supporting member (1).

This requires that the rear illuminants (13) serving each aperture be unique to that band pass filter (10), and similarly that they have separate light absorbing panels (11) arranged lengthwise in parallel spaced-apart locations, and diffusers (8) and narrow band pass filters (10).

This can be a benefit in systems where it might be difficult to synchronize the switching speeds of the rear illuminants with that of the camera operating at a certain frame rate, such as those used in high speed photography.

b—In another embodiment light source assembly (4) uses a single light source (13) with six primary narrow bandpass color filters (10) assembled and rotating on a disk. The brightness of the individual colors and the overall color balance of the white light being produced by the rapidly changing filters is adjusted using neutral density filters positioned with each narrow bandpass color filter.

c—another embodiment similar to embodiment (b), will use a Ferris wheel assembly to hold the filters. A polarizing filter located behind the diffusers enables the brightness of the individual colors to be controlled by rotating separate polarizing filters in front of each of the six primary narrow bandpass color filters (10).

The foregoing are descriptions of preferred embodiments of the invention which are given here by way of example only. The invention is not to be taken as limited to any of the specific features as described, but comprehends all such variations thereof as come within the appended claims.

What is claimed is:

1. An apparatus for use in evaluating and adjusting the color and tonal reproduction of electronic imaging systems and comprising;

an externally front illuminated precision reference test pattern panel, said pattern including grayscale, and black and white reference patches, and at least one mid-saturation color patch;

a front light source in front of the test pattern panel, illuminating said test panel;

an aperture located centrally in said test pattern panel for transmitting light from the rear to the front of said test pattern panel, a rear light source behind the test pattern panel for emitting colors of exceedingly high saturation close to or beyond that capable of being perceived by human vision, through said aperture in said test pattern panel, whereby said imaging system may receive, simultaneously, both the front illuminated image of said test pattern and light from said rear light source passing through said aperture;

light absorbing panels between said rear light source and said aperture for absorbing light from said front light source, to help maintain maximum saturation in the high saturation colors by restricting said front light directed at the front-lit grayscale and color patches of the test pattern from reaching the highly saturated rear light source;

a light diffuser and a space between said light absorbing panels and said diffuser; and, a black panel insertable into said space.

2. An apparatus for use in evaluating and adjusting the color and tonal reproduction of electronic imaging systems as claimed in claim 1, wherein said rear light source combines three primary colors, red, green, and blue in a single beam.

3. An apparatus for use in evaluating and adjusting the color and tonal reproduction of electronic imaging systems as claimed in claim 2 including switching mechanism whereby the three primary colors may be turned on and off in sequence to produce six different highly saturated colors red, green, blue, cyan, magenta and yellow.

4. An apparatus for use in evaluating and adjusting the color and tonal reproduction of electronic imaging systems as claimed in claim 3, including switching mechanism whereby the sequencing speed and order may be varied.

5. An apparatus for use in evaluating and adjusting the color and tonal reproduction of electronic imaging systems as claimed in claim 4, wherein the sequencing speed may be increased to the point where, due to the persistence of human vision, instead of seeing individual colors, the area of said aperture illuminated by said rear light source appears as white.

6. An apparatus for use in evaluating and adjusting the color and tonal reproduction of electronic imaging systems as claimed in claim 5, including adjustment mechanism whereby to adjust the brightness of each of the red, green and blue lights individually, and whereby the color of the white light being emitted from the rear illuminated light source may be adjusted infinitely from 2500° Kelvin to 12,000° Kelvin.

7. An apparatus for use in evaluating and adjusting the color and tonal reproduction of electronic imaging systems as claimed in claim 6, wherein the switch mechanism is operable to set the Kelvin temperature of light being emitted by the rear illuminated light source whereby the temperature may be switchable and set to a number of standard color temperatures selected from the group comprising 3000, 3200, 5000, 5500, 6000 and 6500 K.

8. An apparatus for use in evaluating and adjusting the color and tonal reproduction of electronic imaging systems as claimed in claim 2, including separate cyan, magenta and yellow rear light sources in addition to the red, green and blue and, which emit their colors individually so that they may be seen simultaneously by a device viewing the image produced by the apparatus.

9. An apparatus for use in evaluating and adjusting the color and tonal reproduction of electronic imaging systems as claimed in claim 8, including individual controls provided for setting the brightness level of each color.

10. An apparatus for use in evaluating and adjusting the color and tonal reproduction of electronic imaging systems as claimed in claim 1 including a light proof enclosed passageway between said test panel and said rear light source, and including light absorbing panels in said passageway.

11. An apparatus for use in evaluating and adjusting the color and tonal reproduction of electronic imaging systems as claimed in claim 10 wherein said light absorbing panels extend lengthwise along said passageway in parallel spaced apart locations.

\* \* \* \* \*